United States Patent [19]

McMullen

[11] Patent Number: 5,398,618
[45] Date of Patent: Mar. 21, 1995

[54] CONVEYOR TROLLEY WHEEL ASSEMBLY

[75] Inventor: Russell A. McMullen, East Brunswick, Australia

[73] Assignee: VFV Polymers Pty. Ltd., Victoria, Australia

[21] Appl. No.: 234,717

[22] Filed: Apr. 28, 1994

Related U.S. Application Data

[63] Continuation-in-part of Ser. No. 920,277, Jul. 31, 1992, abandoned.

[30] Foreign Application Priority Data

Feb. 26, 1991 [AU] Australia .............. PK4801
Oct. 2, 1991 [AU] Australia .............. PK8691

[51] Int. Cl.⁶ .............................. B65G 17/32
[52] U.S. Cl. ...................... 105/148; 16/45; 16/46
[58] Field of Search .............. 105/154, 155, 148; 16/97, 98, 18 R, 45, 46, 29, 30, 40; 384/275, 449, 294, 288, 30

[56] References Cited

U.S. PATENT DOCUMENTS

| 314,959 | 3/1885 | Mendenhall | 16/45 |
|---|---|---|---|
| 314,966 | 3/1885 | Mendenhall | 16/45 |
| 1,232,563 | 10/1917 | Kail | 16/98 |
| 1,432,966 | 10/1922 | Chesnutt | 16/45 |
| 2,022,347 | 11/1935 | Hoerle | 16/45 |
| 2,780,178 | 2/1957 | Zebley | 105/154 |
| 3,193,335 | 7/1965 | Wing | 384/300 |
| 3,469,892 | 9/1969 | Langstroth | 16/98 |
| 3,602,150 | 8/1971 | Frost | 105/155 |
| 3,951,076 | 4/1976 | Knudsen et al. | 105/155 |
| 4,433,627 | 2/1984 | Forshee | 105/154 |
| 4,858,752 | 8/1989 | Ballard | 105/154 |
| 4,976,550 | 12/1990 | Shobert | 384/300 |

FOREIGN PATENT DOCUMENTS

7298/55 9/1955 Australia .
55019/80 8/1980 Australia .

OTHER PUBLICATIONS

Derwent Abstract Accession No. K1294Y/45, (Ignatov), Dec. 2, 1976.
Derwent Abstract Accession No. 87-127972/18, (Conveyor Des Inst), Sep. 15, 1986.
Derwent Abstract Accession No. 84-268200/43, (Bryan Trasp Eqpt), Feb. 28, 1984.
Derwent Abstract Accession No. K6852W/39, (Dyatlov), Apr. 3, 1975.

Primary Examiner—Mark T. Le
Attorney, Agent, or Firm—Kinney & Lange

[57] ABSTRACT

An improved wheel configuration for use in a conveying system includes a solid wheel body (11) produced from a high temperature resistant hard wearing polymer material, the wheel body being carried rotatably on a shaft member (13, 28, 39, 46) which in turn is mounted from a support member (16) adapted to carry some desired object over a path defined by the conveying system, the shaft member (13, 28, 39, 46) and a retaining element (14, 45) forming a connection which defines a predetermined length of said shaft member on which the wheel body is carried without axial pressure being applied to said wheel body (11) such that rotation of said wheel body (11) would be impaired.

11 Claims, 7 Drawing Sheets

CONVEYOR TROLLEY WHEEL ASSEMBLY

This is a File Wrapper continuation-in-part of application Ser. No. 07/920,277, filed Jul. 31, 1992, now abandoned.

BACKGROUND OF THE INVENTION

The present invention relates to improvements in rollers for use in conveying equipment, particularly of the type adapted to convey manufactured parts through a series of manufacturing stages.

Commonly conveying equipment of this type is often used to convey parts into and out of ovens where paint or the like might be dried or cured. Thus the conveying equipment must also be capable of withstanding the environmental conditions through which such parts are moved. In one configuration, rollers of the aforementioned kind consist of a metal wheel adapted to rotate and roll on a suitable guide track with a hanger element depending therefrom which carries the part to be transported. Commonly two such wheels might be located oppositely disposed with their respective hangers commonly joined and carrying the part to be transported. There are numerous other forms of similar conveyors where there is some form of wheel assembly or combination arranged in use to roll in, on, over or around a metal guide track of a desired formation. For example there are known arrangements comprising pairs of wheels journaled on a support structure with adjacent support structures interconnected by universal pivoting joints. The pairs of wheels may in some situations be arranged such that adjacent pairs have their axes of rotation generally at right angles to one another. These assemblies are often used when lighter loads are to be carried and perhaps tighter curves in the desired track are required. In such arrangements heavier loads can be accommodated by adding wheel pairs to the assembly. Commonly conveying arrangements as aforesaid, whatever, the combination or configuration, have traditionally used metal wheels with some form of bearing that required lubrication. The lubrication normally being supplied periodically by application of a grease gun to a grease nipple provided for the purpose. When such roller wheels pass into and out of ovens operating at temperatures often in excess of 400° F., there is considerable strain placed on the lubricating performance of the grease. In addition, in some conveying systems, the supporting wheel combinations may be required to travel through refrigeration areas or the like where very cold temperatures can be experienced which provide a further factor affecting wheel and lubricant performance. As a result very expensive greases must be used. Despite this, even the greases available for use in hot temperature zones have temperature capabilities just above the usual oven operating temperatures and can fail in unusual conditions, i.e. being stalled in the oven zone for a longer than usual time. Of course there are also situations where conveyor systems operate in ambient or near ambient temperature conditions. Often one or more people can be continuously employed to supply grease to the rollers or wheels as they pass a certain point in the conveying system so that grease is used in such cases at a reasonably high rate. The operators can, however, occasionally overfill the roller wheels with grease and this can lead to seizure of the wheels. Finally, metal wheels rolling on metal guide tracks have the disadvantage of creating substantial and unwanted noise. There are, therefore, a substantial number of problems with these existing wheels.

The objective of the present invention is, therefore, to provide a wheel assembly for conveyor systems of the aforementioned kind which will avoid the need of lubrication such as grease and thereby overcome or substantially minimise some if not all of the foregoing difficulties with presently used metal wheel systems.

SUMMARY OF THE INVENTION

According to one aspect of the present invention there is provided a wheel configuration for use in a conveying system comprising a guide track in or on which the wheel configuration for use in a conveying system comprising a guide track in or on which the wheel configuration is adapted to roll, said wheel configuration being adapted to be mounted from support means which in turn is intended to carry a load along said guide track, said wheel configuration including shaft member means adapted to be connected to said support means, a wheel body formed of polymer materials having an outer peripheral surface adapted to roll along said guide track, dry bearing means axially extending between said shaft member means and said wheel body, said bearing means having an inherent dry coefficient of friction adapted to permit rotation of said dry bearing means on said shaft member means whereby said wheel body rotates during rolling along said guide track, first retainer means being provided at an outboard end (relative to said support means) of said shaft member means radially extending therefrom to retain said wheel body on said shaft member means, and connection means cooperating with said shaft member means positively preventing axial pressure being applied to radial faces of said wheel body beyond a predetermined limit permitting operational rotation of said wheel body when assembled.

In one preferred arrangement, a second retainer means is provided at an inboard end of said shaft member whereby the wheel body is retained between the two retainer members. Alternatively, the support means itself may form a retainer on the inboard side of the wheel body.

In a further preferred arrangement, the shaft member may include a plain bearing in tubular form located between an inner shaft part and the inner peripheral surface of said wheel body. Preferably the plain bearing is produced from a material having an inherent low dry coefficient of friction adapted to permit relative movement between appropriate surfaces to allow rotation of the wheel body without the use of any liquid or semi-liquid lubricant materials. A suitable solid material of this type might be a PTFE (polytetrafluoroethylene) based plastics material, the constituents being selected dependant upon the end use of the wheel configuration. In a particularly preferred arrangement, for either high or low temperature operation, the aforesaid plain bearing may further include radial flanges adapted to be positioned between substantially stationary radial surfaces on either side of the wheel body and the wheel body itself. These stationary radial surfaces may be formed by inner surfaces of the retainer means or perhaps on the support means. Conveniently, a plain bearing of the aforesaid configuration will be split along its length, preferably at its mid point such that each half is identical.

According to a second aspect, the present invention provides a wheel assembly comprising a wheel body, a metal shaft and a solid bearing located between said shaft and said wheel body. Conveniently, the wheel body is a high temperature resistant, hard wearing plastics material. The wheel body may for example be made from a composite material based on a high temperature resin bound and reinforced with fibre or fibre laminates. The resin may be high temperature epoxy or phenolic resin and the fibres may be aramid fibres or fibre laminates.

Preferably the solid bearing is produced from a blend of PTFE (polytetrafluoroethylene) and minerals which are selected for high temperature bearing use. The solid bearing may conveniently comprise an annular section having radially extending end regions located at either end, the end regions being engaged by radially extending flanges of the metal shaft. The solid bearing thereby is provided with axially extending and radially extending bearing surfaces between the metal shaft and its end flanges and the bearing material.

In a particularly preferred embodiment the bearing is formed by a pair of bearing half parts of substantially the same shape each having one of the radially extending regions. In this manner the bearing half parts might in use be swapped about to accommodate possible uneven wear and thereby extend the operational life of the assembly. Moreover, if one part becomes damaged, the part might be readily replaced without having to replace the whole bearing.

In a further preferred embodiment, the bearing means may be formed by filaments or filament web material in a plurality of layers bound by a thermosetting plastics resin material, the filament or filament web material being formed at least partially by a material having an inherent dry coefficient of friction whereby said wheel body, in use, rotates on said shaft member means.

Conveniently, the layers in the bearing zone are a synthetic low friction self lubricating polymer, blended, woven, or formed into a matrix with a high strength natural fibre or a polyester or aramid fibre. The filament material is at least partly formed by a polytetrafluoroethylene (PTFE) (or its substitutes) based material. Preferably part of the filament material or filament web material is formed from a reinforcing material of sufficient strength such as aramid fibres. The filament material or filament web material is preferably wound in a continuous or substantially continuous length, however, layered discrete lengths could also be used but would be more difficult to handle in production. The depth of the bearing zone should be at least sufficient to ensure that the dry low coefficient of material is not worn away during normal use.

According to a second aspect, the present invention provides a method of producing a wheel configuration for use in a conveying system comprising a guide track in or on which the wheel configuration is adapted to roll, said wheel configuration being adapted to be mounted for rotation on a shaft member of support means which, in turn, is intended to carry a load along said guide track, said method comprising providing fibre laminates or filaments which are at least partially formed from or contain a material having an inherently low dry coefficient of friction, winding said fibre laminates or filaments onto a mandrel to form a plurality of layers, bonding said layers with a thermosetting resin material to thereby form a bearing zone, and forming a wheel body of a plastics material on an outer surface of said bearing zone, said wheel body having an outer peripheral surface adapted to roll on said guide track.

Conveniently, the fibre laminates or filaments may be continuous (or semi-continuous) or may be in discrete lengths. The fibre laminate may be in the form of a woven web having filaments of the low dry coefficient of friction material extending either lengthwise or crosswise or in both directions. Preferably, the material having a low dry coefficient of friction is polytetrafluoroethylene (PTFE) based or is based on any of known substitutes for PTFE. The bonding thermosetting resin material is conveniently a high temperature resistant epoxy or phenolic resin. Conveniently, the fibre laminates or filaments are passed through a bath of the thermosetting resin material before being wound on the mandrel. Preferably the wheel body is formed by winding fibre laminates or filaments onto the outer surface of the bearing zone to form a plurality of layers bonded with a thermosetting plastics material thereon. Conveniently, the thermosetting plastics material is the same material as used in the bearing zone. Preferably the fibre laminates or filaments in the wheel body zone are formed from aramids.

In a preferred method of construction, a wide bearing zone and wheel body is formed from a mandrel as aforesaid and after curing, is machined to divide same up into a plurality of individual wheels of desired shape and configuration.

BRIEF DESCRIPTION OF THE DRAWINGS

Several preferred embodiments will hereinafter be described with reference to the accompanying drawings in which.

DETAILED DESCRIPTION OF THE PREFERRED EMBODIMENTS

Figure 1:
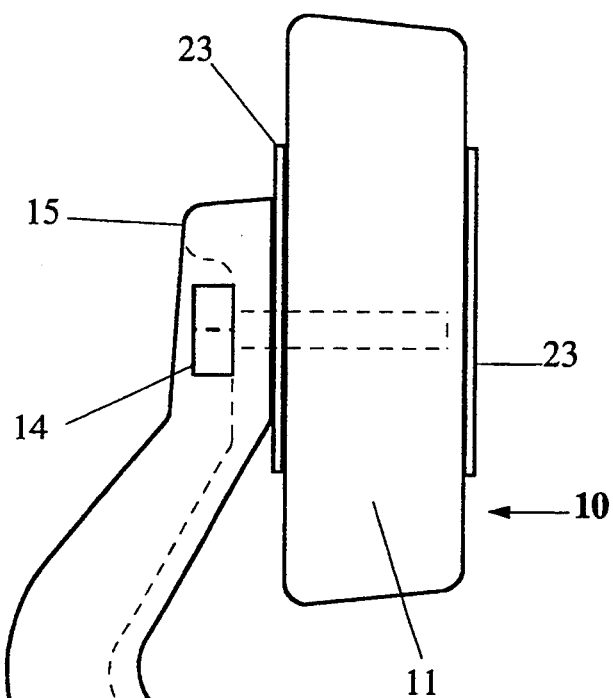
FIG. 1 is a side view of a wheel assembly and hanger in combination.
Figure 2:
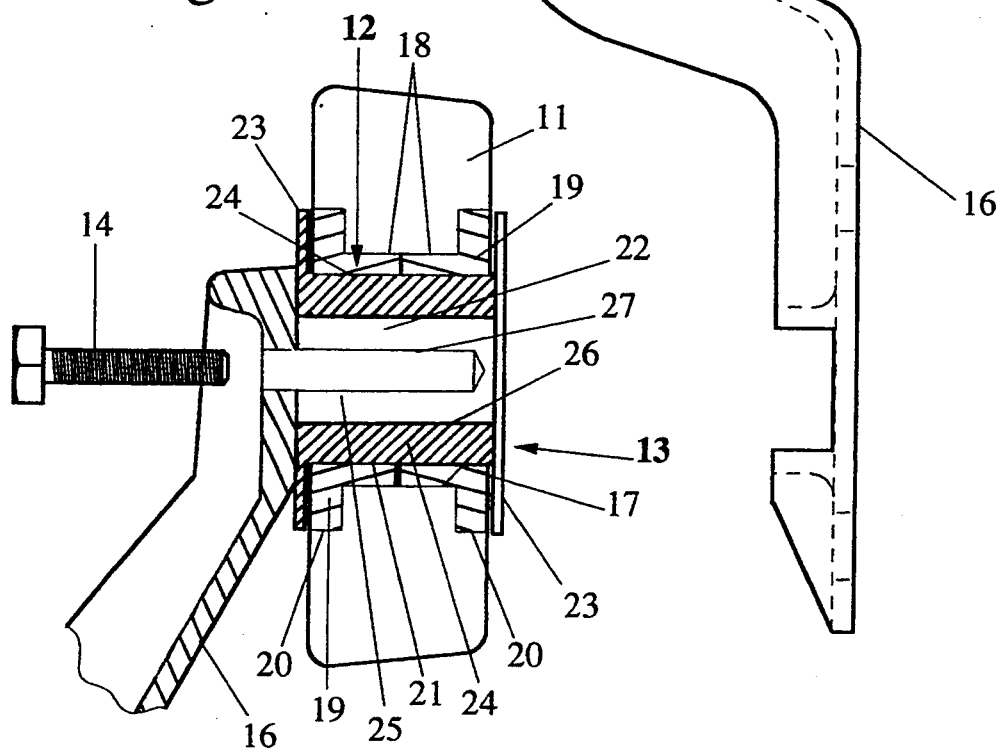
FIG. 2 is a longitudinal cross-sectional view through the wheel region of the assembly shown in FIG. 1.

With regard to FIGS. 1 and 2, the wheel assembly and hanger combination comprises a wheel assembly 10 including a wheel body 11, a solid bearing 12, metal shaft 13, a fastening screw or bolt element 14 and a hanger 15. The hanger 15 includes a depending section 16 which operates with another similarly constructed assembly to carry a part through a series of manufacturing steps. In use the pair of wheel bodies roll on an appropriate guide track (not shown) to achieve this desired transport of the part.

The wheel assembly comprises a solid wheel body made of a high temperature hard wearing plastics material which will have the effect of achieving the required wear characteristics while limiting the amount of noise generated during use of the assembly. The plastics material may be a high temperature resistant epoxy or phenolic based resin bound and reinforced with aramid fibre laminates. The wheel body 11 has a central bore 17 to accommodate the bearing 12 and the mounting shaft 13. The bearing 12 is conveniently formed in two parts of substantially the same shape and dimensions each having an axial section 18 and a radially extending flange 19 which is accommodated in an annular recess 20 in the wheel body 11. The mounting shaft 13 is also preferably constructed in two parts 21, 22 each having a radially extending flange 23 of similar dimensions to the flanges 19 of the bearing. The shaft part 21 includes an axial section 24 of a length equivalent to twice the axial length of one bearing part so that the two bearing parts are effectively retained between the flanges 23 of the mounting shaft 13. In this manner axial and radial bearing surfaces are provided. The shaft mounting part 22 includes an axial extending trunnion 25 which is received within a bore 26 within the shaft part 21. Finally a single screw or bolt 14 may be used to pass through the hanger 15 and the shaft parts 21, 22 to be screwed into a bore 27 in the shaft part 22 to hold the complete assembly together. If desired, a spring washer may also be used to prevent loosening of the bolt during use.

Figure 3:
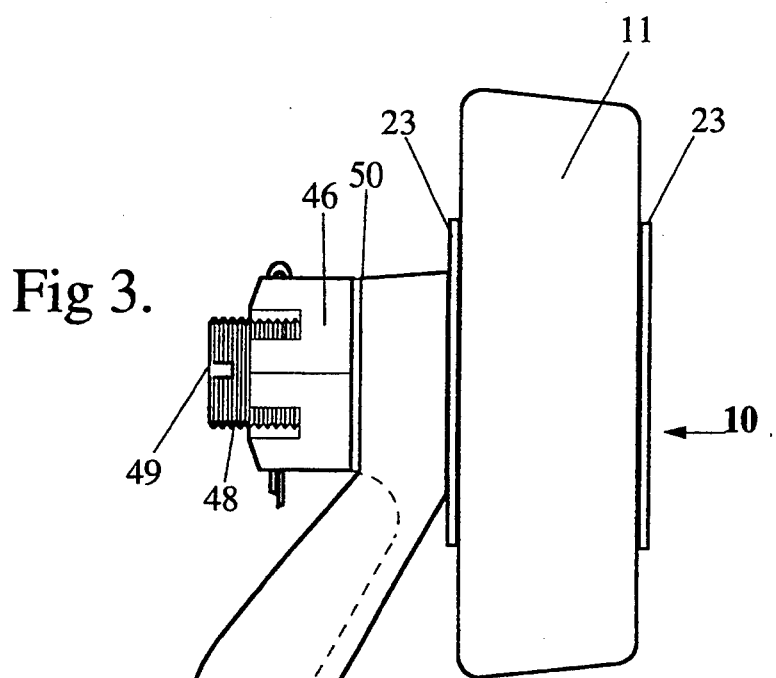
FIG. 3 is a view similar to FIG. 1 showing an alternative embodiment.
Figure 4:
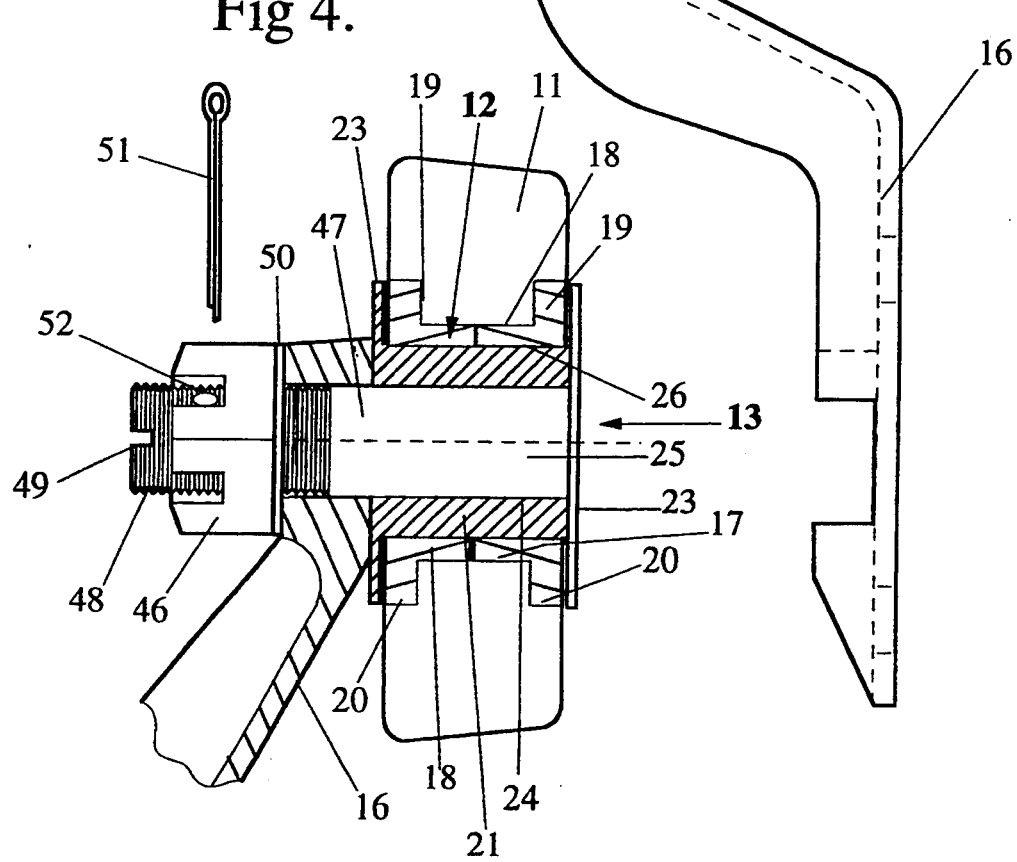
FIG. 4 is a longitudinal cross-sectional view through the wheel region of the assembly shown in FIG. 3.

FIGS. 3 and 4 illustrate an embodiment similar to FIGS. 1 and 2 except that in this case, the trunnion of shaft part 22 includes a coaxially extending shaft portion 47 with an outward thread formation 48 that is adapted to pass through the shaft part 21 and the hanger 16 to be engaged by a castellated nut 46. The end of the shaft portion 47 may include a slot 49 enabling engagement with a screw driver to allow the element 22 to be held stationary while tightening the nut thereon.

If desired, a spring washer 50 or some other washer designed to inhibit loosening of the nut 46 might be used. Finally a split pin 51, can be employed engaging within a transverse hole 52 in the shaft portion 47 and the nut 46 to positively prevent loosening of the nut 46.

In the foregoing manner, the provision of a wheel and hanger assembly is achieved without the need to use any separate lubrication system and which can be safely used in high, low or ambient temperature situations.

Figure 5:
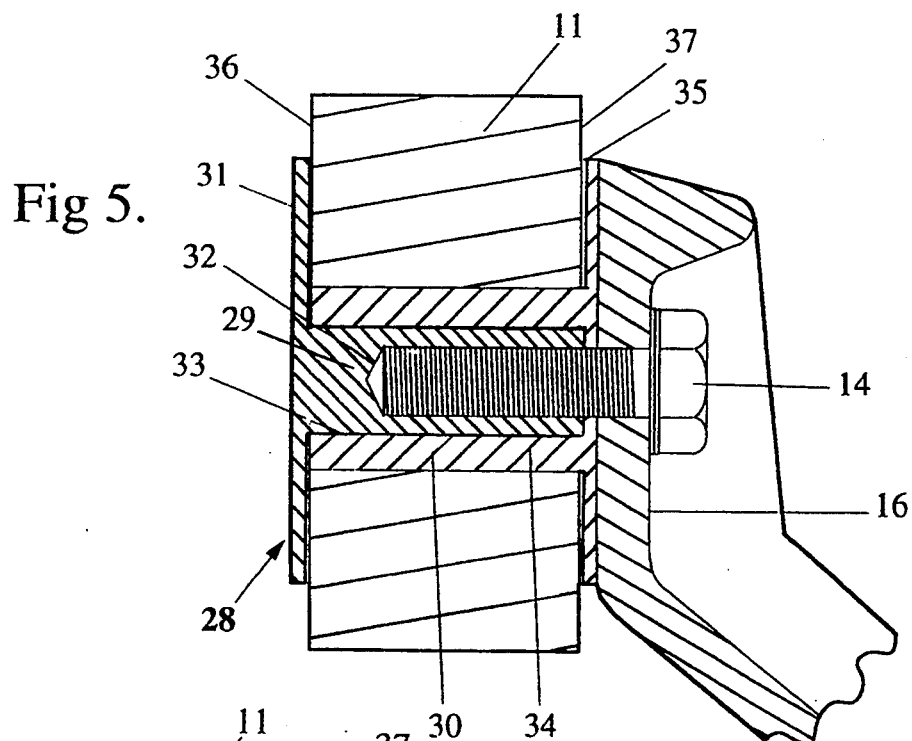
FIGS. 5 to 11 are cross-sectional views through wheel assemblies of alternative preferred embodiments.

FIGS. 5 to 11 illustrate further differing preferred wheel constructions within the scope of the present invention. FIG. 5 illustrates a wheel body 11 mounted on a shaft member 28. The shaft member 28 may be produced from a metal such as steel and is formed of two sections 29, 30. The section 29 includes an outboard retaining flange 31 and an inner shaft part 32 received within a bore 33 of a shaft part 34 of the second section 30. The second section 30 may also include a radially extending retainer flange 35. The length of the shaft part 34 is selected to be no less than the width of the wheel body 11 so that when a connecting means 14 such as a bolt is tightened, substantially no axial pressure is applied against the radial faces 36, 37 of the wheel body 11.

Figure 6:
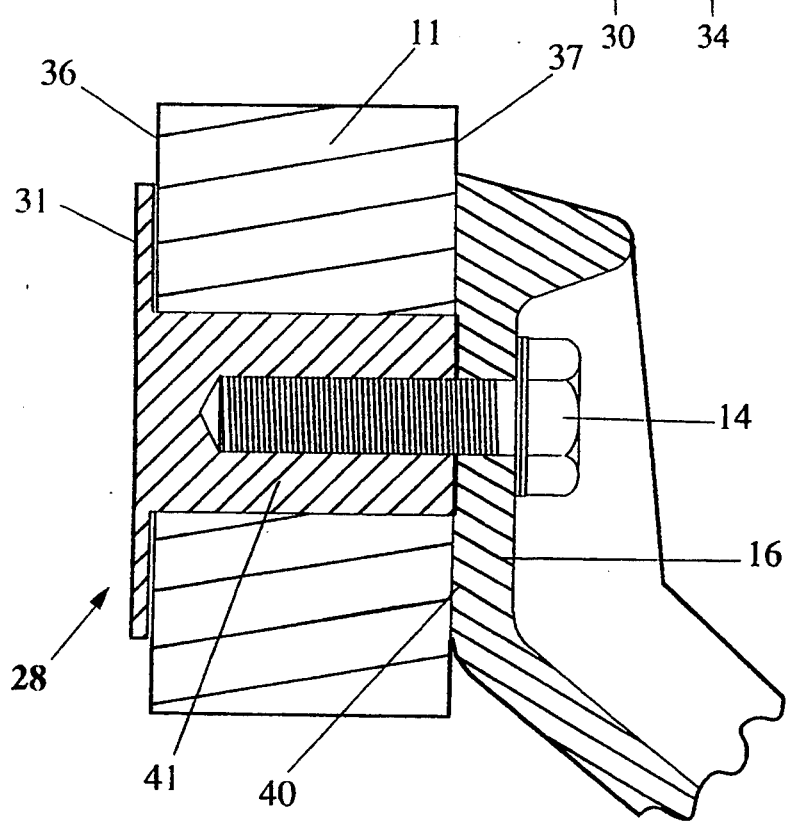

FIG. 6 illustrates a configuration where the shaft member 39 is formed in one part with a face 40 of the support member 16 acting as the inboard retaining element for the wheel body 11. In this case, the length of the shaft section 41 of the member 39 is no less than the width of the wheel body 11 so that no axial pressure is applied against the faces 36, 37 of the wheel body when the bolt 14 is tightened.

Figure 7:
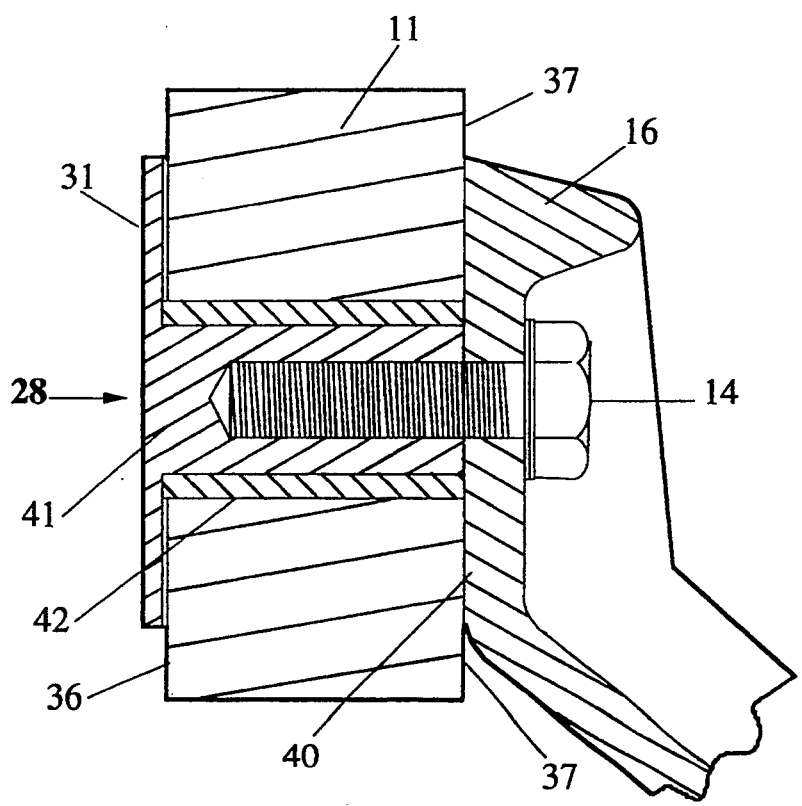

FIG. 7 illustrates a still further configuration similar to FIG. 6 but in this case including a plain tubular bearing 42 of a low coefficient of friction material such as PTFE based materials. It will of course be appreciated that, depending on the application, such a plain tubular bearing might be included in the embodiments of FIGS. 5 and 6. Moreover a bearing arrangement as disclosed in FIGS. 2 and 4 might also be used.

Figure 8:
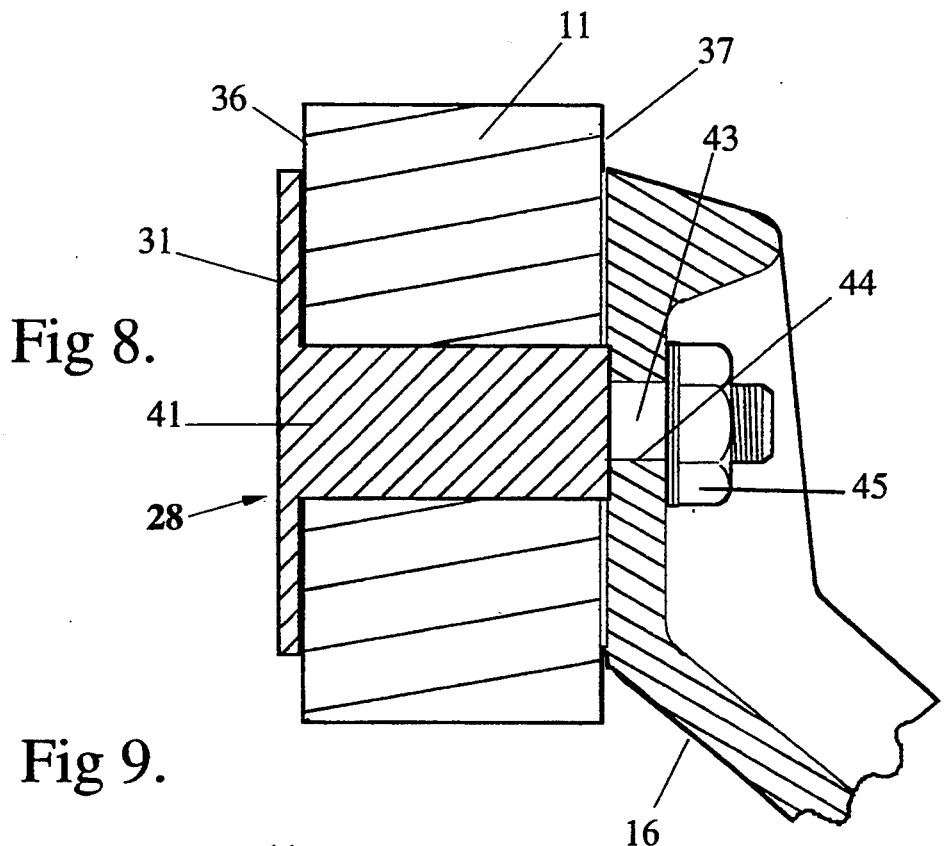

FIG. 8 illustrates a still further possible embodiment. In this case the shaft section 41 has an outboard flange 31 and a section of reduced diameter 43 which passes through a bore 44 in the support member 16. The reduced diameter section 43 may be threaded along its length or plain through the member 16 but at least its end is threaded to allow a nut 45 and washer or lock washer to secure the assembly together as illustrated. Naturally any of the previously described bearing arrangements could also be used in this embodiment.

Figure 9:
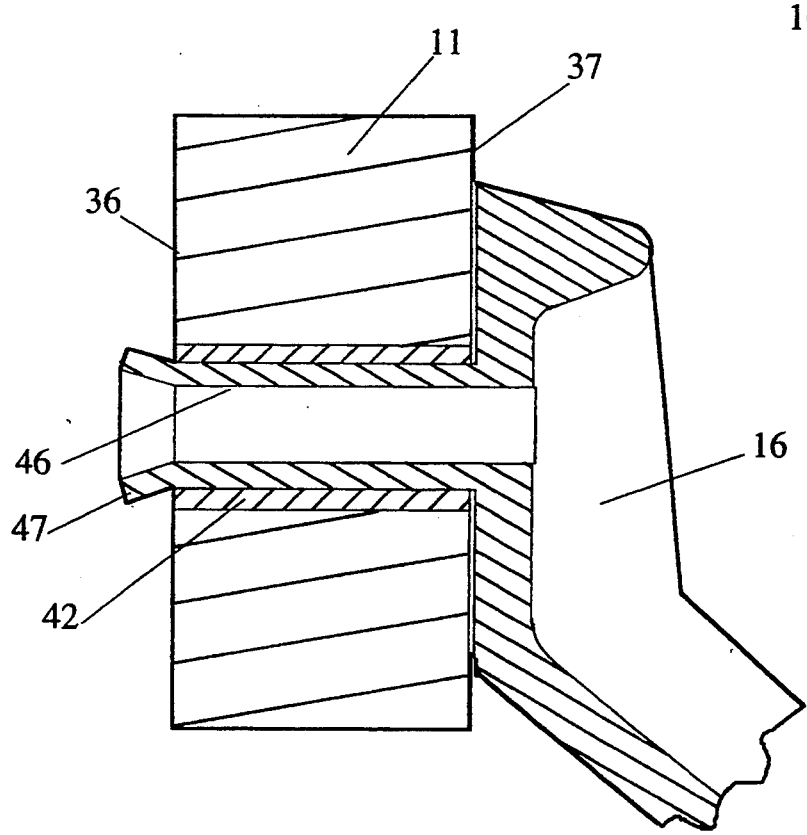

A still further preferred embodiment is illustrated in FIG. 9 where the shaft section 46 is integrally formed with the support member 16. A tubular bearing 42 may be used if desired and the wheel body 11 is retained on the shaft section 40 and bearing 42 by swaging or mechanically deforming the end of the shaft section radially outwardly as illustrated to create a retaining flange 47.

Figure 10:
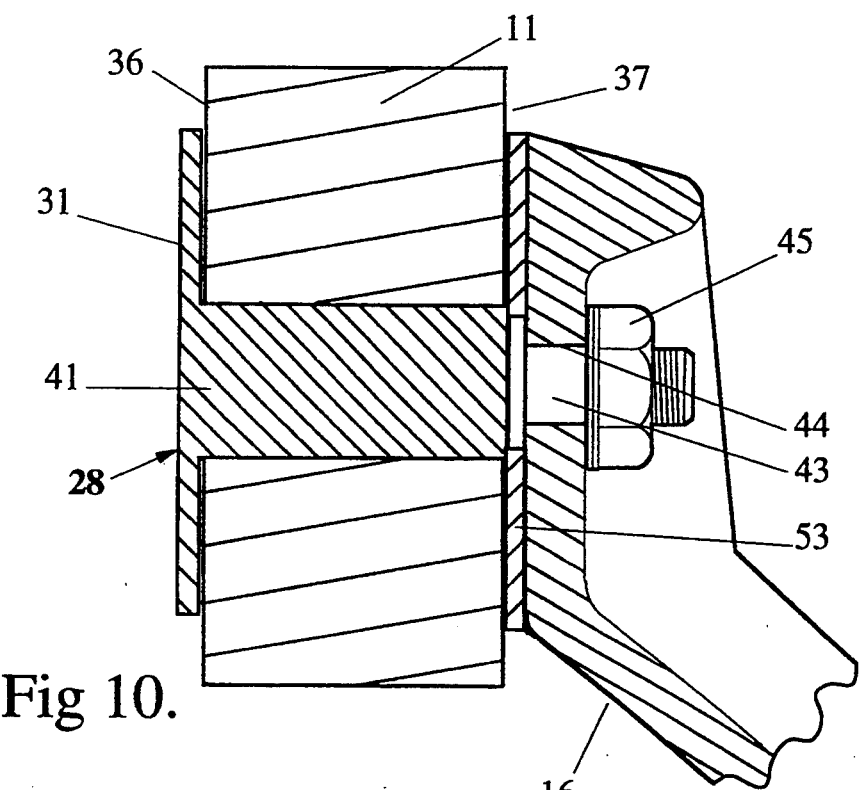
Figure 11:
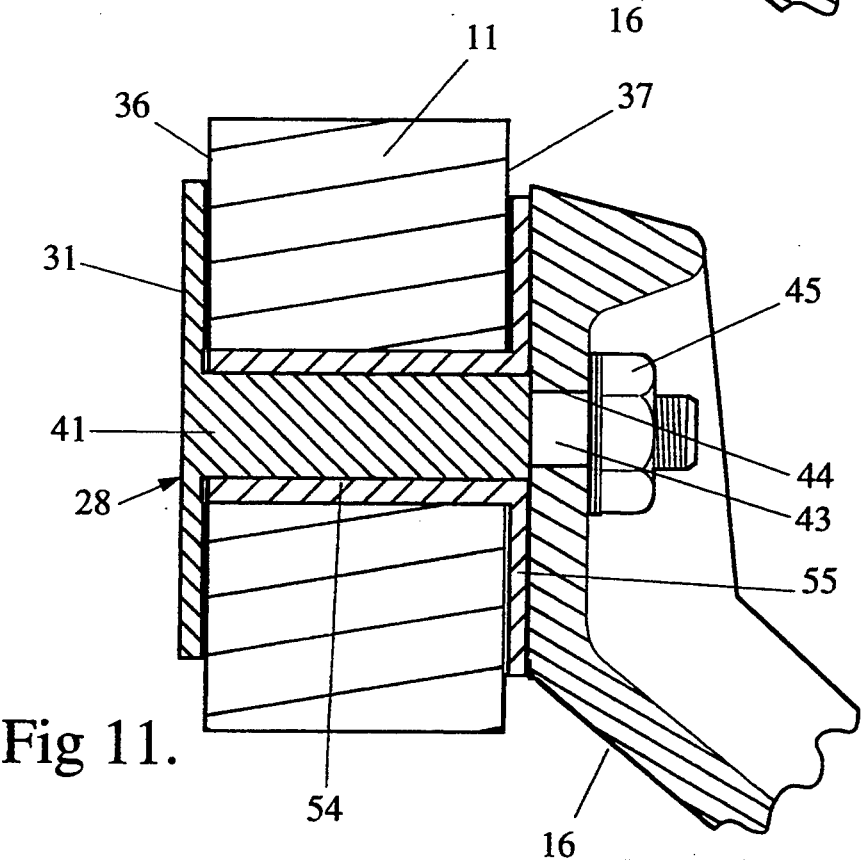

Yet other embodiments are illustrated in FIGS. 10 and 11 which are similar to the embodiment of FIG. 8. In FIG. 10, a washer 53 is provided between the radial face 37 of the wheel body 11 and the adjacent face of the support member 16. If desired the washer may be formed from a low friction material such as a plastics material based on PTFE but it could also be formed from standard metal materials or the like. In FIG. 11, a bearing sleeve 54 is combined with radial flange 55 located between the face 37 and the support member 16. In this embodiment, both an axial bearing and a rotational bearing is provided.

The wheel body 11 may itself be produced from a number of differing thermosetting plastics materials. The wheel body 11 may be based on thermosetting reinforced resins with reinforcing materials being synthetic or natural minerals in nature. The wheel body may be formed of synthetic fibre reinforced resin, either filament wound or laminated depending upon the application of the product. Wheel construction can also be in the form of molded, reinforced resins with the reinforcement being mineral based products, i.e. glass fibre, glass bead, carbon, coke, graphite or other natural occurring minerals. Reinforcing materials can also be polymeric in nature, i.e. other thermoplastic and/or thermoset resins blended with the base resin to reinforce construction of the wheel body. All resin components used in the wheel body construction should have required strength, wear resistance, corrosion resistance and environment compatibility for the intended purpose of the unit.

Bearings used in the wheel assembly should have a low dry coefficient of friction and therefore require no lubrication. Desirably any bearing materials used should have long life and low maintenance characteristics.

Bearings used in the wheel assembly may be thermoplastic and/or thermoset in nature with the primary purpose being as a self-lubricating, long life, low maintenance component. Basic construction of the bearings can be in the form of molded and machined bearings utilising Polytetrafluoroethylene (PTFE) with natural, mineral or synthetic reinforcements to give strength, improved wear characteristics, environmental compatibility and low frictional coefficients. Construction of the bearings can also be in the form of extruded and machined, injection molded or automatically molded resin products and reinforcing materials including but not limited to PTFE based materials.

The axial or shaft assemblies may be in the form of plated steel, stainless steel or other material compatible with the wheel body and bearing components and the environmental conditions of the end application. The design of the split axle allows the user to safely assemble the various components without over torquing the wheel/bearing assembly thus causing excessive loading on the assembly. Straight axles can also be utilised in applications where wheel assembly is to retrofit existing hardware and a split axle design is inappropriate.

Components are designed to be used in conjunction with the operating conditions of the end user. Combinations of materials and production processing are predicated on actual applications. All materials are designed to function in the broadest possible environmental and operating conditions including but not limited to cryogenic temperatures, high temperatures up to 350° C., corrosive environments, water, steam, under loads in excess of 1000 kg, and at speeds up to 120 meters per minute, all without the use of liquid or semi-liquid lubrication.

In one preferred construction for high or low temperature operation, the wheel body may be formed by winding fibre laminates or filaments onto a mandrel. The laminates may be in the form of sheets or a continuous web and preferably are aramids. The filament or laminate may be passed through a bath of resin prior to winding on the mandrel. Alternatively the reinforcing filament or laminate could be impregnated with resin after winding on the mandrel. Conveniently the resin is adapted to resist the intended temperatures and temperature gradients of end use but may be a high temperature epoxy or phenolic resin. After curing of the resin, the construction is removed from the mandrel and this construction can then be divided into wheel components and machined to the desired sizes and final shape. The advantage of this form of construction is that the reinforcing distributes the loads around the wheel rather than being located at a point as would be the case with a cast plastics material wheel.

Figure 12:
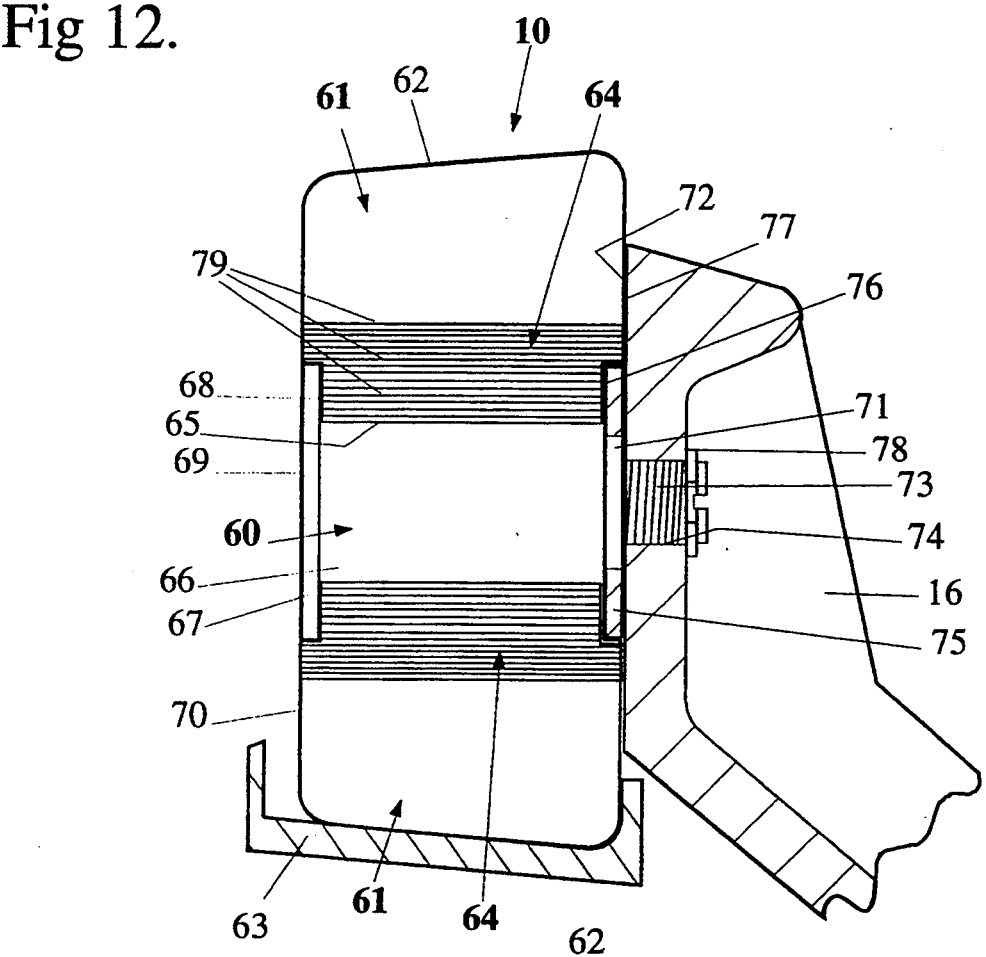
FIG. 12 is a cross-sectional view through a wheel assembly of a still further preferred embodiment.

Referring now to FIG. 12, a wheel assembly 10 is shown secured to a conveyor support hanger 16 by a shaft member 60. The wheel assembly 10 has an outer wheel body 61 with a peripheral outer surface 62 adapted to roll in a guide track or the like 63. A bearing zone 64 of the wheel assembly 10 is located inwardly of the wheel body 61 and includes a bore 65 having a sliding fit over a central cylindrical shaft portion 66 of the shaft member 60. An outer end of the central shaft portion 66 has an integrally formed radially extending retaining flange 67 which is received in a recess 68 in the wheel assembly 10 so that the outer face 69 of the flange 67 is substantially flush with an outer face 70 of the wheel assembly 10.

At the inner end of the central shaft portion 67 there is an abutment portion 71 having a diameter less than the central portion 67 which is adapted to abut against the adjacent face 72 of the hanger 16. A further end shaft portion 73 is threaded and engages with a threaded bore 74 in the hanger 16. The end shaft portion 73 is reduced in diameter relative to the abutment portion 71 so that when threading the end portion 73 into the bore 74, the abutment portion 73 engages the hanger face 72 to define a minimum distance between the flange 67 and the hanger face 72. If desired, a washer 75 may be provided over the abutment portion 71 and a recess 76 is provided in the inner face 77 of the wheel to accommodate the washer. The distance between the inner faces of the two recesses 68 and 77 is such as to ensure no axial pressure is applied to these faces or between the inner wheel face 77 and the adjacent hanger face 72. The shaft member 60 is conveniently prevented from disengagement with the hanger (i.e. rotating to disengage the threaded connection) by a circlip 78. Obviously, any other fastening means might be used such as a nut on a threaded shaft. Moreover, any style of shaft construction might be employed such as those disclosed in FIGS. 1 to 11 so long as axial pressure on the radial faces of the wheel is avoided.

Figure 13:
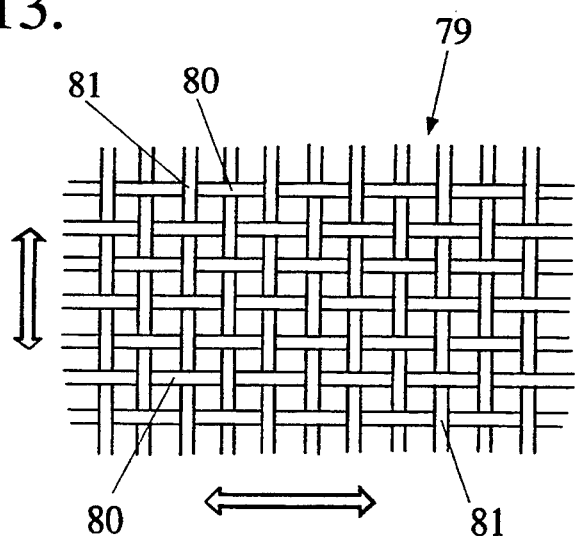
FIG. 13 is a schematic plan view of a web of filament material used in the construction of a wheel as shown in FIG. 12.

Reference will now be made to the construction of the bearing zone 65. This zone is formed by a plurality of layers 79 of filaments which are at least partially formed from a PTFE based material or a suitable substitute therefor. These may be single filaments or filaments made into webs as shown in FIG. 13. At least some of the filaments in the bearing zone should be reinforcing type fibres such as aramids to provide adequate strength to the bearing zone. For example, the filaments 80 in the longitudinal direction (horizontal in FIG. 13) may be aramid fibres whereas the filaments 81 in the transverse direction may be PTFE based fibres. The layers 79 may be bonded by a thermosetting resin such as a phenolic or epoxy based resin. Each layer 79 is required to extend to the radial faces of either the recesses 68, 77 or the radial faces 70, 77 of the wheel assembly 10 so as to ensure PTFE (or its equivalent) material is located at all stationary/rotating surface interfaces. The wheel body 61 may be manufactured in a similar manner to the foregoing except that the filament of PTFE (or its equivalent) are replaced by reinforcing material filaments. For example, when a web such as that shown in FIG. 13 is used, both the filaments 80, 81 in the zone 61 are of reinforcing standard, e.g. an aramid. The thermosetting resin material in the zone 61 is also preferably a high temperature resistant resin material. Manufacturing techniques for the wheel assembly 10 may be as earlier described herein. In an alternative arrangement, the wheel body might be separately formed and fitted onto the bearing zone and suitably bonded thereto.

By the arrangement discussed above with reference to FIGS. 12 and 13, it is possible to create a wheel body that can be used in extreme temperatures and temperature differentials without the need of liquid or semi-liquid lubricants but which also does not require the separate manufacturing steps required for the solid dry lubricant bearing member disclosed in FIGS. 1 to 11.

Although the present invention has been described with reference to preferred embodiments, workers skilled in the art will recognize the changes may be made in the form and detail without departing from the spirit and scope of the invention.

I claim:

1. A wheel for use in a conveying system comprising a guide track in or on which the wheel is adapted to roll, said wheel being adapted to be mounted from a support means intended to carry a load along said guide track, said wheel including shaft member means adapted to be connected to said support means, a wheel body formed of polymer materials having an outer peripheral surface adapted to roll along said guide track, and dry bearing means axially extending between said shaft member means and said wheel body, said bearing means having an inherent dry coefficient of friction adapted to permit rotation of said dry bearing means on said shaft member means during rolling of said wheel along said guide track, first retainer means extending outwardly from said shaft member means at an outboard end of said shaft member means relative to said support means, said first retainer means having an outer perimeter located at a radial distance intermediate the outer peripheral surface of said wheel body and an outer diameter of said shaft member means, said bearing means further having a first axially facing bearing surface having a radially outer edge at a radial distance at least equal to that of said outer perimeter of the first retainer means whereby sliding bearing contact occurs between said first axial facing bearing surface and an inner surface of said first retainer means, and connection means co-operating with said shaft member means and positively preventing axial pressure being applied to radial faces of said wheel body beyond a predetermined limit permitting operational rotation of said wheel body when assembled.

2. A wheel according to claim 1 further including second retainer means located at an inboard end of said shaft member means relative to said first retainer means, said bearing means including a second axially facing bearing surface whereby sliding bearing contact occurs between said second axially facing bearing surface and an inner surface of said second retainer means.

3. A wheel according to claim 2 wherein said first retainer means is integrally formed with said shaft member means.

4. A wheel according to claim 2 wherein said second retainer means is integrally formed with said shaft member means.

5. A wheel according to claim 1, wherein said bearing means is formed by filaments or filament web material in a plurality of layers bound by a thermosetting plastics resin material, the filament or filament web material being formed at least partially by a material having an inherent dry coefficient of friction whereby said wheel body, in use, rotates on said shaft member means.

6. A wheel according to claim 1, wherein the wheel body is formed by an outer zone located outwardly of said bearing means, said outer zone being formed by reinforcing filaments or filament web material in a plurality of layers, said bearing means being formed by a plurality of layers of filaments or filament web material which is at least partially formed by a material having an inherent dry coefficient of friction whereby said wheel body, in use, rotates on said shaft member means, each of said filaments or filament web material in said outer zone and in said bearing means being bound by a thermosetting plastics resin material.

7. A wheel according to claim 6, wherein the thermosetting plastics resin material in the outer zone is the same as that in the bearing means.

8. A wheel assembly comprising a wheel rotatably connected to a support means adapted for use in a conveying system comprising a guide track in or on which the wheel is adapted to roll while said support means carries a load along said guide track, said wheel including shaft member means, a wheel body formed of polymer materials having an outer peripheral surface adapted to roll along said guide track, and dry bearing means axially extending between said shaft member means and said wheel body, said bearing means having an inherent dry coefficient of friction adapted to permit rotation of said dry bearing means on said shaft member means during rolling of said wheel along said guide track, first retainer means extending outwardly from said shaft member means at an outboard end of said shaft member means relative to said support means, said first retainer means having an outer perimeter located at a radial distance intermediate the outer peripheral surface of said wheel body and an outer diameter of said shaft member means, said bearing means further having a first axially facing bearing surface having a radially outer edge at a radial distance at least equal to that of said outer perimeter of the first retainer means whereby sliding bearing contact occurs between said first axial facing bearing surface and an inner surface of said first retainer means, and connection means connecting said shaft member means to said support means and positively preventing axial pressure being applied to radial faces of said wheel body beyond a predetermined limit permitting operational rotation of said wheel body when assembled.

9. A wheel assembly according to claim 8 further including second retainer means located at an inboard end of said shaft member means relative to said first retainer means, said bearing means including a second axially facing bearing surface whereby sliding bearing contact occurs between said second axially facing bearing surface and an inner surface of said second retainer means.

10. A wheel assembly according to claim 9 wherein said first retainer means is integrally formed with said shaft member means.

11. A wheel according to claim 9 wherein said second retainer means is integrally formed with said shaft member means.

* * * * *